(12) United States Patent
Stoddart et al.

(10) Patent No.: US 12,664,553 B2
(45) Date of Patent: Jun. 23, 2026

(54) WIRELESS TAMPER DETECTION

(71) Applicant: VeriFone, Inc., Wilmington, DE (US)

(72) Inventors: Ian Matthew Stoddart, Leeds (GB);
Rajesh Kumar Ravulapalli,
Middlesbrough (GB)

(73) Assignee: VeriFone, Inc., Wilmington, DE (US)

( * ) Notice: Subject to any disclaimer, the term of this
patent is extended or adjusted under 35
U.S.C. 154(b) by 0 days.

(21) Appl. No.: 18/699,044

(22) PCT Filed: Oct. 7, 2021

(86) PCT No.: PCT/US2021/071764
§ 371 (c)(1),
(2) Date: Apr. 5, 2024

(87) PCT Pub. No.: WO2023/059357
PCT Pub. Date: Apr. 13, 2023

(65) Prior Publication Data
US 2025/0232307 A1     Jul. 17, 2025

(51) Int. Cl.
*G06Q 20/20*     (2012.01)
*G01S 13/02*     (2006.01)
(Continued)

(52) U.S. Cl.
CPC ...... *G06Q 20/4016* (2013.01); *G01S 13/0209*
(2013.01); *G01S 13/88* (2013.01)

(58) Field of Classification Search
CPC ...... G01S 13/00; G01S 13/0209; G01S 13/02;
G01S 13/88; G01S 7/41; G06Q 20/4016;
G06Q 20/20; G06F 21/86
See application file for complete search history.

(56) References Cited

U.S. PATENT DOCUMENTS

| | | | |
|---|---|---|---|
| 6,422,475 B1 | 7/2002 | May | |
| 2005/0151645 A1 | 7/2005 | Meskens et al. | |

(Continued)

FOREIGN PATENT DOCUMENTS

| | | | | |
|---|---|---|---|---|
| EP | 3213105 B1 * | 5/2021 | .............. | G01S 5/02 |
| WO | 2010123471 A1 | 10/2010 | | |

(Continued)

OTHER PUBLICATIONS

International Search Report and the Written Opinion of the International Searching Authority, PCT Application No. PCT/US2021/071764, pp. 1-8, dated Jan. 26, 2022.

(Continued)

*Primary Examiner* — Hao Fu
(74) *Attorney, Agent, or Firm* — Bond, Schoeneck &
King, PLLC

(57) ABSTRACT

A payment device and method of detecting a tampering condition of a payment device are provided. The payment device and method include using on-board radios, e.g., ultra-wideband (UWB) radios, to define a reference signature of the payment device and/or the environment surrounding the payment device and comparing the reference signature to a sample signature at periodic intervals or generally over time to determine if a physical change to the payment device has occurred. If the difference between the reference signature and the sample signature is above a predetermined value or threshold, a tamper condition is satisfied and the device may lock down or erase sensitive data, preventing the unauthorized collection of sensitive transaction information.

20 Claims, 6 Drawing Sheets

(51) Int. Cl.
    *G01S 13/88*        (2006.01)
    *G06Q 20/40*      (2012.01)

(56) References Cited

U.S. PATENT DOCUMENTS

| | | |
|---|---|---|
| 2015/0091547 A1 | 4/2015 | Vasilev et al. |
| 2020/0134985 A1 | 4/2020 | Fujimoto et al. |
| 2020/0228351 A1* | 7/2020 | Kreft .................... H04L 9/3247 |

FOREIGN PATENT DOCUMENTS

| | | | |
|---|---|---|---|
| WO | WO-2011128778 A2 * | 10/2011 | ............. G06F 21/86 |
| WO | 2020208505 A1 | 10/2020 | |

OTHER PUBLICATIONS

Supplementary EP Search Report, EP Patent Application No. 21960081.
4, dated May 8, 2025, pp. 1-14.
Communication Pursuant To Rules 70(2) and 70a(2) EPC, EP Patent
Application No. 21960081.4, May 27, 2025, 1 page.
Communication Pursuant To Article 94(3) EPC, EP Patent Appli-
cation No. 21960081.4, dated Apr. 28, 2026, pp. 1-3.

\* cited by examiner

Reference Signature 144     142A     142B     142C     142D     142E

| Channel | Char. | Refl. 1 | Refl. 2 | Refl. 3 | Refl. 4 | Refl. 5 |
|---|---|---|---|---|---|---|
| Ch. 1 136A | Mag (dB) | 7 | 7 | 6 | 7 | 8 |
| | Phase (Degrees) | 156 | 156 | 179 | 59 | 65 |
| | TOF (ns) | 0.067 | 0.067 | 0.072 | 0.333 | 0.311 |
| Ch. 2 136B | Mag (dB) | 8 | 8 | 6 | 8 | 7 |
| | Phase (Degrees) | 191 | 191 | 215 | 239 | 250 |
| | TOF (ns) | 0.067 | 0.067 | 0.072 | 0.333 | 0.311 |

Fig. 4A

Sample Signature 152     150A     150B     150C     150D     150E

| Channel | Char. | Refl. 1 | Refl. 2 | Refl. 3 | Refl. 4 | Refl. 5 |
|---|---|---|---|---|---|---|
| Ch. 1 136A | Mag (dB) | 7 | 7 | 6 | 7 | 8 |
| | Phase (Degrees) | 157 | 190 | 178 | 59 | 65 |
| | TOF (ns) | 0.066 | 0.081 | 0.071 | 0.331 | 0.312 |
| Ch. 2 136B | Mag (dB) | 8 | 9 | 6 | 8 | 7 |
| | Phase (Degrees) | 190 | 211 | 215 | 239 | 250 |
| | TOF (ns) | 0.066 | 0.090 | 0.072 | 0.333 | 0.311 |

Fig. 4B

WIRELESS TAMPER DETECTION

CROSS-REFERENCE TO RELATED APPLICATIONS

The present application is a United States National Stage Application pursuant to 35 U.S.C. § 371 of International Patent Application No. PCT/US2021/071764, filed Oct. 7, 2021, and entitled, "Wireless Tamper Detection," the disclosure of which is hereby incorporated by reference in its entirety.

BACKGROUND

Aspects and implementations of the present disclosure are generally directed to systems, devices, and methods for detecting a tamper condition within or around a Point of Sale (POS) device, POS terminal, or other payment device.

Device tampering in payment devices presents a problem to businesses and payment processors. In practice, some devices are attended or unattended, e.g., where the device is installed in a location where regular supervision or no supervision of the device occurs. In unattended installations, such as gas pump kiosks or outdoor payment terminals, the payment device can be compromised by nefarious third parties hoping to gain sensitive transaction information from the device. Typically, the third party can insert certain physical tools, such as a probe or card skimmer into the card reader slot of the payment device and attempt to gain sensitive information from future transactions.

SUMMARY OF THE DISCLOSURE

The present disclosure provides a payment device and method of detecting a tampering condition of a payment device. The payment device and method include using on-board radios, e.g., ultra-wideband (UWB) radios, to define a reference signature of the payment device and/or the environment surrounding the payment device and comparing the reference signature to a sample signature at periodic intervals or generally over time to determine if a physical change to the payment device has occurred. If the difference between the reference signature and the sample signature is above a predetermined value or threshold, a tamper condition is satisfied and the device may lock down or erase sensitive data, preventing the unauthorized collection of sensitive transaction information.

Some payment devices include a Wi-Fi radio and/or a Bluetooth radio for external communications. Wi-Fi and Bluetooth radio technologies can also be used for localization. UWB is a relatively new radio technology that is typically used to measure the range and/or angle between two devices. UWB also uses different frequencies (e.g., 6.5 GHz or 8 GHz) for signal transmission than Wi-Fi (2.4 GHz & 5 GHZ) or Bluetooth (2.4 GHz), which, among other things, minimizes signal interference. The present disclosure proposes using ultra-wideband (UWB) radios to generate the reference and sample signatures.

The present disclosure aims to use UWB radio transmissions to transmit a reference signal and measure the reflections of that signal from the payment device and/or the environment surrounding the payment device, e.g., the environment around the radio's antennas. The reflected reference signals are used to create a reference signature for the payment device. Throughout use of the device, the UWB radios can be used to generate additional signals, e.g., sample signals, that are used to make a sample signature.

Throughout use the sample signature will change based on the environment the payment device is installed into. Any changes between the reference signature and the sample signature can indicate a tamper condition. For example, should a third party attempt to attach a false keypad onto the device, the device's sample signature will deviate or change with respect to the reference signal. If the deviation or change is above a predetermined value or threshold, a tamper condition is alerted and the device can lock itself down. Importantly, the signature will change even where changes to the payment device do not change the external dimensions of the payment device. For example, should a third party insert a card skimmer into the card reader slot of the payment device, although this would not change the external dimensions of the payment device, this will still register as a change in the sample signature from the reference signature, and thus indicate a tamper condition.

As will be discussed below, the UWB radio can utilize all available channels to create the reference and/or sample signatures. There are several advantages to using UWB to create the signatures over existing radio technologies. For example, UWB frequencies are less congested than those used by Wi-Fi and Bluetooth and are less likely to suffer from interference (intentional or otherwise). UWB is a wide band, short pulse technology designed for measurement and detection applications, whereas Wi-Fi and Bluetooth use narrow bands with long signals. Therefore, using wide band channels and short pulses provides high resolution to changes in the reference signature.

The transmission and receive of sample signals, and thus the generation of sample signatures can be changed to suit the particular environment the payment device is installed in or can be dynamically adjusted to changing environments. Once the payment device has been installed and a reference signature has been generated, the payment device does not require any additional interaction or maintenance until a tamper condition is detected.

In one example, a payment device is provided, the payment device including a housing and at least one ultra-wideband (UWB) radio disposed within the housing wherein the UWB radio is configured to transmit at least one reference signal and measure a reflected reference signal from the housing and/or an environment around the housing to generate a reference signature, wherein a change in a subsequent UWB radio signature relative to the reference signature above a predetermined value indicates a tamper condition.

In an aspect, the housing includes a printed circuit board (PCB) board and wherein the UWB radio is located on the PCB board.

In an aspect, the PCB board includes or is electrically connected to a card reader assembly.

In an aspect, the at least one UWB radio includes a plurality of antennas.

In an aspect, the housing has a first end and a second end and wherein the UWB radio is positioned closer to the second end of the housing than the first end of the housing.

In an aspect, the reference signature includes a measurement of at least one of: a magnitude of the reflected reference signal, a phase difference between the reference signal and the reflected reference signal; and a time-of-flight of the reference signal and/or the reflected reference signal.

In an aspect, the measurement of the reference signature includes measurements obtained from at least two channels.

In an aspect, the at least one reference signal includes a plurality of reference signals and the reference signature includes measurements across a plurality of reflected reference signals corresponding with the plurality of reference signals.

In an aspect, the subsequent UWB radio signature includes transmission of at least one sample signal and measurement of at least one reflected sample signal from the housing and/or an environment around the housing to generate at least one sample signature, wherein a difference between the at least one sample signature and the reference signature above the predetermined value indicates the tamper condition.

In an aspect, the at least one sample signature includes a plurality of sample signatures and wherein the plurality of sample signatures are compared to the references signature to indicate the tamper condition.

In another example, a method of detecting a tamper condition is provided, the method including: generating, via an ultra-wideband (UWB) radio disposed within a housing of a payment device, a reference signal of the payment device within an environment; receiving, via the UWB radio, at least one reflected reference signal from the housing and/or the environment; generating a reference signature from the at least one reflected reference signal; generating, via the UWB radio, at least one sample signal; receiving, via the UWB radio, at least one reflected sample signal; generating at least one sample signature from the at least one reflected sample signal; comparing the at least one sample signature to the reference signature; and determining a tamper condition when the at least one sample signature differs from the reference signature above a predetermined value.

In an aspect, the housing of the payment device includes a printed circuit board (PCB) and wherein the UWB radio is located on the PCB board.

In an aspect, the PCB board includes or is electrically connected to a card reader assembly.

In an aspect, the UWB radio includes a plurality of antennas.

In an aspect, the plurality of antennas include a first antenna and a second antenna; wherein the first antenna is a first receiver and a first transmitter and the second antenna is a second receiver.

In an aspect, the housing has a first end and a second end and wherein the UWB radio is positioned closer to the second end of the housing than the first end of the housing.

In an aspect, the step of generating the reference signature from the at least one reflected reference signal further includes measuring at least one of: a magnitude of the at least one reflected reference signal, a phase difference between the reference signal and the reflected reference signal; and a time-of-flight of the reference signal and/or the reflected reference signal.

In an aspect, the step of measuring includes taking measurements obtained from at least two channels.

In an aspect, the at least one reference signal includes a plurality of reference signals and the reference signature includes measurements across a plurality of reflected reference signals corresponding with the plurality of reference signals.

In an aspect, the at least one sample signature includes a plurality of sample signatures and wherein the plurality of sample signatures are compared to the at least one reference signature to indicate the tamper condition.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 4A is a schematic illustration of a reference signature according to the present disclosure.

FIG. 4B is a schematic illustration of a sample signature according to the present disclosure.

DETAILED DESCRIPTION OF EMBODIMENTS

The present disclosure provides a payment device and method of detecting a tampering condition of a payment device. The payment device and method include using on-board radios, e.g., ultra-wideband (UWB) radios, to define a reference signature of the payment device and/or the environment surrounding the payment device and comparing the reference signature to a sample signature at periodic intervals or generally over time to determine if a physical change to the payment device has occurred. If the difference between the reference signature and the sample signature is above a predetermined value or threshold, a tamper condition is satisfied and the device may lock down or erase sensitive data, preventing the unauthorized collection of sensitive transaction information.

Figure 1:
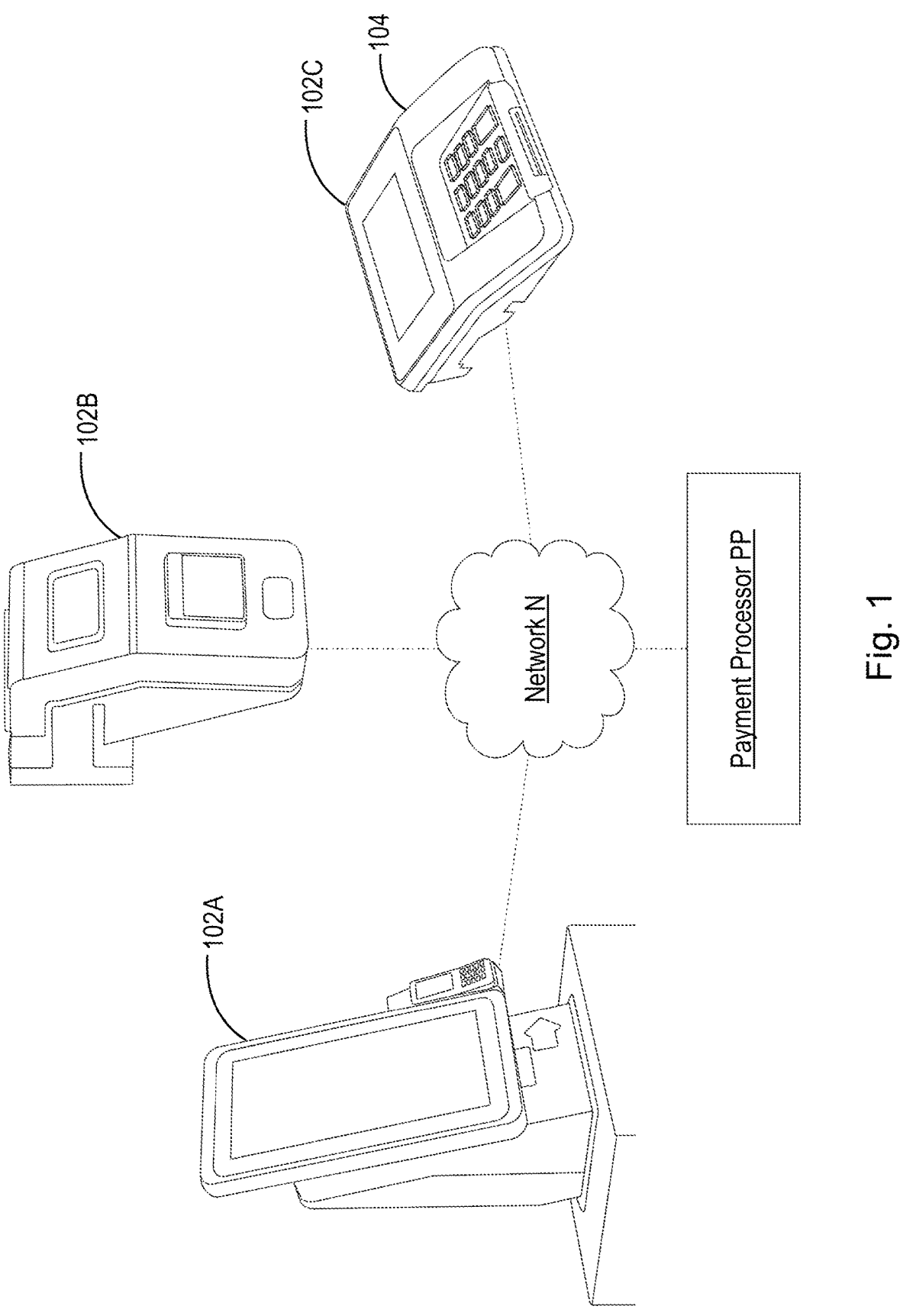
FIG. 1 is a perspective view of examples of point of sale (POS) devices according to the present disclosure.

The following description should be read in view of FIGS. 1-6C. FIG. 1 is a perspective view of a payment system 100 according to the present disclosure. As shown in FIG. 1, payment system 100 can include one or more payment devices 102A-102C (hereinafter referred to in the collective as "payment devices 102" and/or in the singular as "payment device 102"). Each payment device 102 is configured to receive payment information from a user, e.g., a patron at a retail or dining establishment, and may transmit and/or receive payment data via a network N to and/or from a payment processor PP. Network N can be a local area network (LAN), a wide area network (WAN), a 3G network, 4G/LTE network, or may include a plurality of devices and/or servers connected over the internet. It should be appreciated that the connections within and between the payment devices 102 of the network N can include wired or wireless communications. Payment processor PP is intended to be a third-party processor, e.g., a party other than the user of the card, the business establishment, or the provider or the payment devices, that receives payment information from users and performs or handles the financial transaction between the source of funds of the user and the destination of the funds, e.g., the bank of the business establishment. As illustrated in FIG. 1, payment device 102A is shown as a fixed countertop kiosk and POS terminal, payment device 102B is shown as a payment kiosk, and payment device 102C is shown as a fixed multilane payment device and card reader. However, it should be appreciated that payment devices 102 can be selected from at least one of: a fixed or mounted Point of Sale (POS) terminal, a fixed or mounted POS device, a fixed or portable kiosk, a gas pump payment terminal or kiosk, a portable POS device or terminal, a mobile device (e.g., a tablet or smartphone), or any other device capable of reading payment data from a user's card (e.g., a credit or debit card) or other alternative payment methods such as PayPal, Stipe, Apple Pay, Alipay, Klarna, PaySafeCard, Cryptocurrency, etc.

Figure 2:
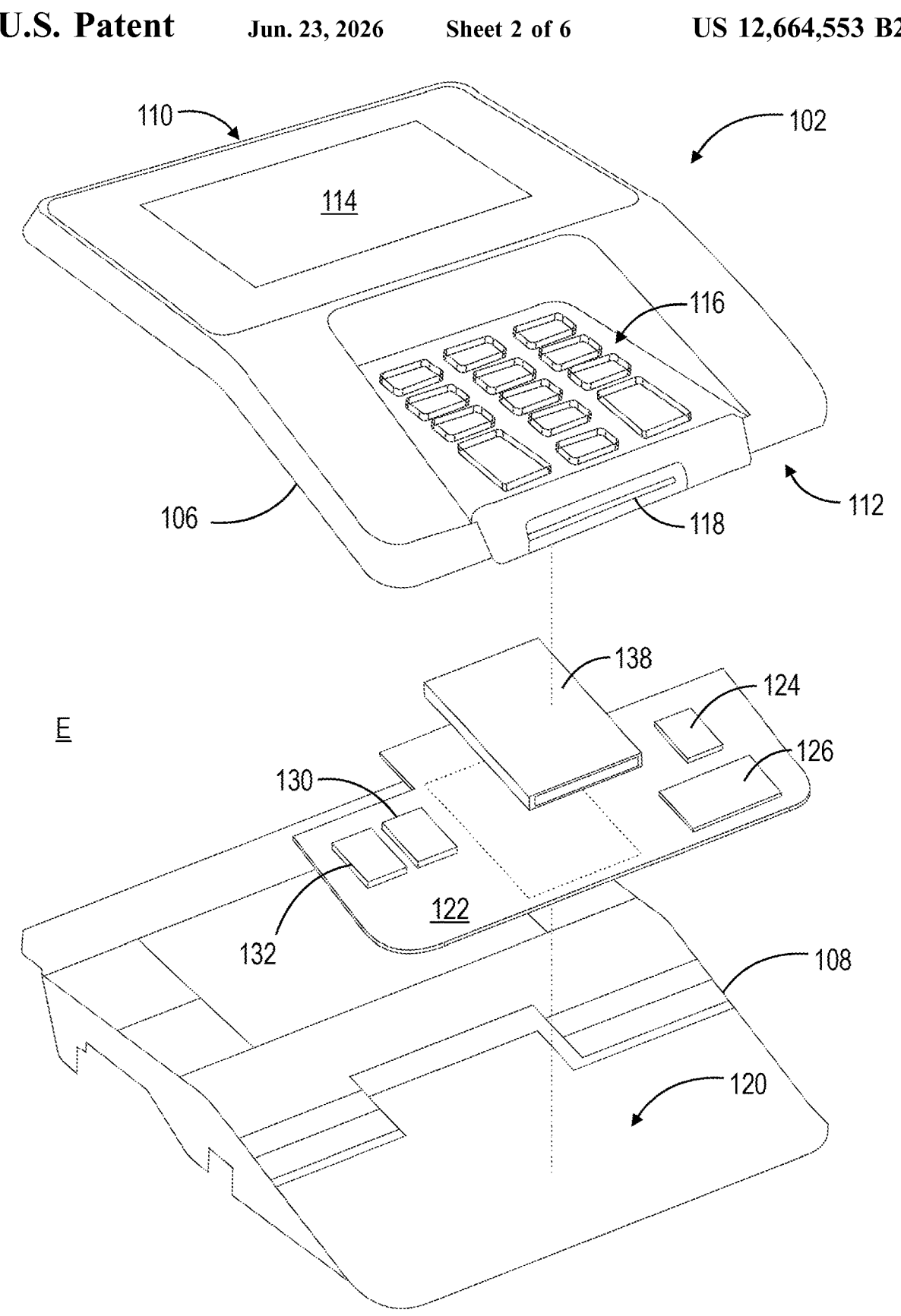
FIG. 2 is a partially exploded perspective view of a payment device according to the present disclosure.

FIG. 2 illustrates an exploded perspective view of a payment device 102 from FIG. 1, e.g., payment device 102C. Payment device 102 has a housing 104 (shown in FIG. 1). As shown in FIG. 2, the housing 104 is separable into two parts or portions, e.g., a top portion 106 and a bottom portion 108. Housing 104, when assembled, also includes a first end 110 and a second end 112. As such, housing 104 can be made from various materials include plastics, metals, glass, or any combination thereof. In the example illustrated, payment device 102 includes a display 114 positioned proximate first end 110 of the payment device 102. Display 114 can be a liquid crystal, light emitting diode (LED), organic LED (OLED), or other display with or without touch-screen functionality or touch sensitivity. It should be appreciated that the display can be integrated into the top portion 106 of housing 104 (as shown in FIG. 2) or may be included within the bottom portion 108 and top portion 106 can include a glass window through which the display can be seen by the user during operation. Top portion 106 also includes a keypad 116 which includes one or more keys configured to receive one or more inputs from the user to, for example, receive a user's personal identification number (PIN) for a given transaction or receive other data from the user, e.g., a user's telephone number. Top portion 106 also includes a card slot 118 configured to receive a user's card, e.g., a credit card, debit card, gift card, or alternative payment card. As shown keypad 116 and card slot 118 are disposed proximate the second end 112 of housing 104.

Figure 3:
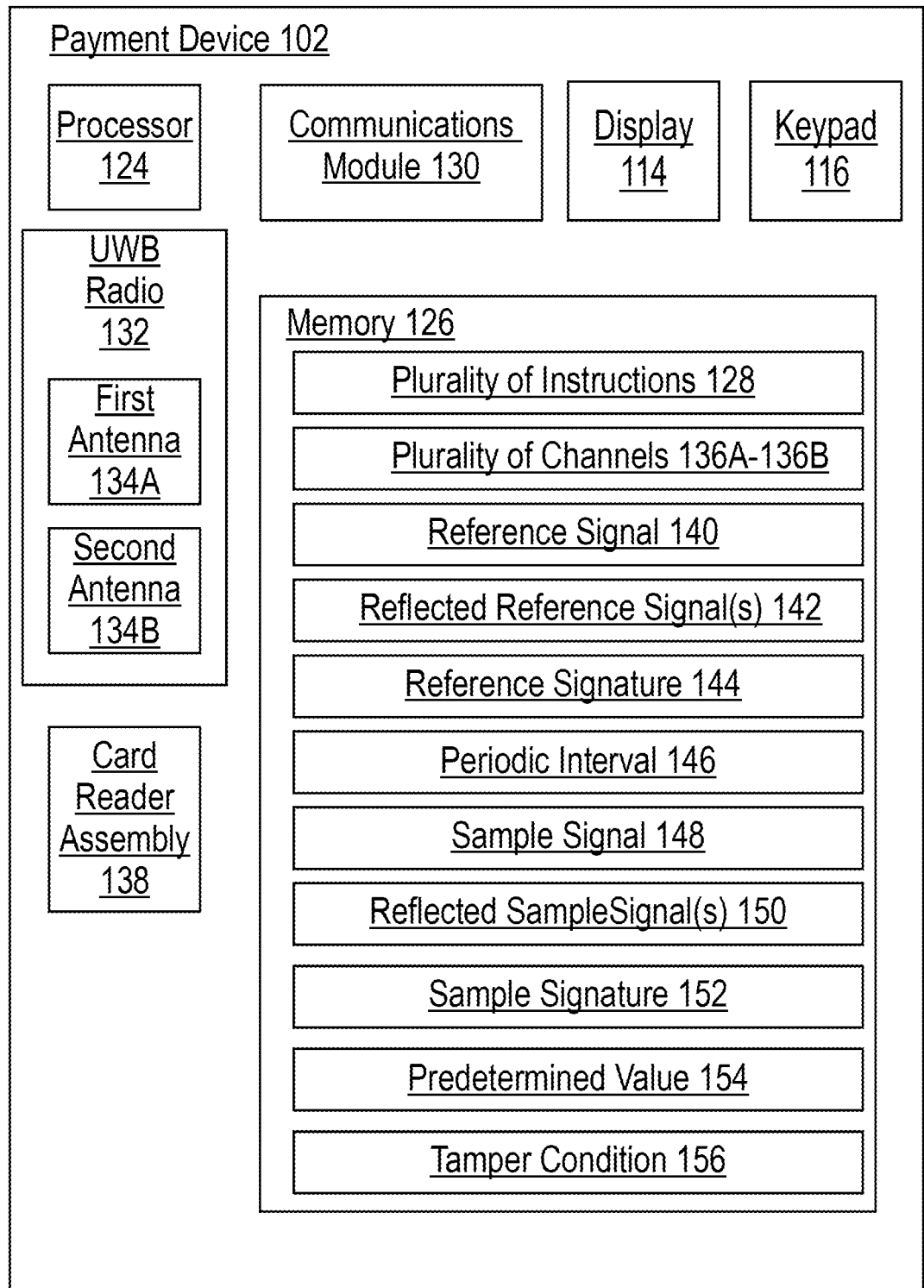
FIG. 3 is a schematic illustration of the internal components of a payment device according to the present disclosure.

When assembled, the space between the top portion 106 and the bottom portion 18 of housing 104 has an internal volume 120. Within the internal volume 120 of the housing 104 of payment device 102, payment device 102 further includes one or more printed circuit boards (PCBs), e.g., PCB 122, which provides a means for electrically connecting one or more of the component discussed herein. As shown in FIGS. 2-3, PCB 122 includes a processor 124 and a memory 126 configured to execute and store, respectively, a plurality of non-transitory computer-readable instructions 128 (shown in FIG. 3), to perform the various functions of payment device 102 as will be described herein. PCB 122 also includes a communications module 130 capable of sending and receiving wired or wireless data within the environment E surrounding payment device 102. For example, communications module 130 can include one or more wireless radios capable of sending and receiving data over various data protocols, e.g., a Wi-Fi radio and/or a Bluetooth radio. provides payment device 102 sending or receiving wired or wireless data within network. In some examples, communications module 130 can include, in addition to at least one wireless radio, some form of auto-mated gain control (AGC), a modulator and/or demodulator, and potentially a discrete processor for bit-processing that are electrically connected to processor 124 and memory 126 to aid in sending and/or receiving wired or wireless data.

Additionally, as will be discussed below in detail, in addition to including one or more wireless radios within communications module 130, PCB 122 of payment device 102 also includes at least one ultra-wideband (UWB) radio 132. As will be discussed below, UWB radio 132 is config-ured to generate a plurality of signals (e.g., reference signal 140 and one or more sample signals 148 (both shown in FIG. 3)) and receive a plurality of reflected signals (e.g., reflected reference signals 142 and one or more reflected sample signals 150 (also shown in FIG. 3 and described below) to generate signatures for comparison. UWB technology uti-lizes low energy, wide band, short pulse radio signals that are typically used for measurement and detection applica-tions. To this end, and as shown in FIG. 3, UWB radio can include a plurality of antennas 134 configured to transmit and/or receive UWB signals or reflected signals from the environment E surrounding and including the payment device 102. As shown, plurality of antennas 134 includes a first antenna 134A and a second antenna 134B. In some examples, first antenna 134A is a transmitter and receiver and second antenna 134B is only a receiver. In the examples described below, the signals transmitted or sent by the UWB radio 132 can be transmitted using first antenna 134A. Immediately after transmitting the signal, the first antenna 134A can switch from a transmitter to a receiver such that the reflected signals from the environment E (discussed below) can be received at both the first antenna 134A and second antenna 134B. By receiving the reflected signals at both antennae 134A-134B, processor 124 can determine the characteristics of the reflected signal with respect to the original transmitted signal to generate the signatures dis-cussed herein. It should be appreciated that UWB radio 132 is not limited to two antennae. For example, UWB radio 132 can include additional antennae, e.g., three, four, five, six, etc. to further increase the spatial resolution and/or dimen-sionality of the signatures created. Furthermore, in broad-casting and receiving the signals described herein, UWB radio 132 can utilize one or more of the fourteen 500-MHZ bands or channels established by the WiMedia Alliance Specification Release 1.5.1. In some examples, as will be illustrated and described with respect to FIGS. 4A-4B, below, the signatures obtained by UWB radio 132 utilize a plurality of channels 136, e.g., at least a first channel 136A and a second channel 136B where the first channel 136A and the second channel 136B are different and within the range of channels used by UWB protocols. It should be appreci-ated that the UWB radio 132 can be positioned closer to the second end 112 of housing 104, e.g., closer to card slot 118 and/or card reader assembly 138 (discussed below) so that the UWB radio 132 is positioned close to the portion of the housing 104 that is most likely to be tampered with by a nefarious party.

As shown in FIGS. 2-3, PCB 122 also includes or is electrically connected to a card reader assembly 138. Card reader assembly 138 is configured to receive at least a portion of a card, e.g., a user's credit card, debit card, gift card, or other type of card via card slot 118 in top portion 106 of housing 104. Although not illustrated, card reader assembly 138 can include one or more electrical contacts or contactless receivers configured to obtain data from the chip located in the user's card and send that data to the payment processor PP to process a transaction. It should also be appreciated that card reader assembly 138 can include a magnetic stripe reader (MSR) reader to obtain data from the magnetic stripe of a user's credit card. Although not illustrated, other components are provided within internal volume 120 and/or provided on or electrically connected to PCB 122 to aid in the function of payment device 102. For example, although not illustrated, payment device 102 can include circuitry for receiving or recognizing individual key strokes from the keys of keypad 116, anti-tamper circuitry, and/or a power supply such as a battery, capacitor, or super-capacitor. Furthermore, in examples where payment device 102 is a kiosk or mobile payment device, payment device 102 can include other structures such as a magnetic card stripe reader positioned along one or more sides of the housing and can be integrally formed as a part of housing 104 or be a separate apparatus. Payment device 102 can also include one or more radio frequency identification (RFID) or near-field communications (NFC) readers configured to obtain card information from an enabled chip at close range, e.g., between 1-10 cm.

As described above, the antennae 134 of the UWB radio 132 positioned on PCB 122 are configured to generate one or more reference signals 140 (shown in FIG. 3) and receive one or more reflections of the reference signals, i.e., reflected reference signals 142A-142E (shown in FIGS. 3-4A), and derive a reference signature 144 (shown in FIG. 4A) indicative of the structure of payment device 102 and/or the structural contents of the immediate surroundings of the payment device within environment E. In some examples, the reference signal 140 is a pulse or short burst signal with an outgoing pulse width selected from a range or 1-4 ns, or in some examples 1.5-2.5 ns, or in some examples, 2 ns. The outgoing reference signal 140 can be sent across multiple channels 136 of the UWB radio 132. For example, the UWB radio 132 can send an outgoing reference signal 140 in two or more frequencies ranges or channels 136 with a pulse width of roughly 2 ns. As these channels 136 are selected from the 14 channels set forth in the WiMedia Alliance Specification (discussed above), each of these channels can be assigned a number, e.g., a first channel, i.e., Channel 1 (136A), and a second channel, i.e., Channel 2 (136B). In some examples, the first channel 136A can have a center frequency of approximately 6500 MHz, or in some examples 6489.6 MHz, while second channel 136B can have a center frequency of approximately 8000 MHz, or in some examples, 7987.2 MHz. These center frequencies correspond with channels 5 and 9, respectively of the 14 available UWB channels.

As illustrated in FIG. 4A, the reference signature 140 can include measurements of multiple reflections, i.e., multiple reflected reference signals 142A-142E (collectively referred to herein as "reflected reference signals 142") from structural elements of the payment device 102 and/or from structures in the immediately surrounding environment E of the payment device 102. In other words, once a reference signal 140 is transmitted or broadcast from UWB radio 132 from within housing 104 of payment device 102, that reference signal 140 contacts and reflects off of various structural elements of the payment device 102 or elements surrounding the payment device 102 and return to UWB radio 132 to be received by one or more of the plurality of antennas 134. Various characteristics of the reflected reference signals 142 can be obtained and used to generate a reference signature 144 for use during operation of payment device 102 and to act as a baseline to determine whether a tamper condition 156 (discussed below) has occurred. When generating the reference signature 144, the characteristics of the reflected reference signals 142 can be selected from at least one of: a magnitude of the reflected signal 142, a phase of the reflected reference signal 142; and a combined time-of-flight of the reference signal 140 and the reflected reference signal 142.

FIG. 4A, illustrates one example of a reference signature 144 shown as a table of reflected reference signal 142 measurements across multiple characteristics. As shown, after sending, transmitting, or otherwise broadcasting reference signal 140 from UWB radio 132, the original reference signal 140 is reflected off of proximate structures within housing 104 and/or from proximate structures outside of, but proximate to, housing 104, generating one or more reflected reference signals 142. One or more antennae of the plurality of antennas 134 are configured to receive the reflected reference signals 142 and determined the characteristics shown, e.g., magnitude of the reflected reference signals 142 in decibels, phase of the reflected reference signals 142 in degrees, and a combined time-of-flight (TOF) of the original reference signal 140 and the reflected reference signal 142 in nanoseconds. As shown, five reflected reference signals 142A-142E are measured. Each of these reflected reference signals 142 represent a reflected representation of original reference signal 140 after reflecting off of one or more surfaces located proximate or within payment device 102. It should be appreciated that more or less reflected reference signals 142 can be used to generate reference signature 144, e.g., 2, 3, 4, 6, 8, 10, 15, or more reflected reference signals 142 can be utilized. As shown, the signals reflected from the reference signal 140 sent over the first channel 136A return decibel magnitude values between 6 and 8 decibels, phases between 59 and 179 degrees, and time-of-flight values between 0.0067 and 0.333 ns. It should be appreciated that these values are exemplary and other values are possible. For example, the magnitude values of the reflected reference signals can be between +/−10 decibels, phase differences can range between 0-359 degrees, and time-of-flight values can range from 0.001-0.5 ns. In some examples where the payment device 102 is larger, e.g., a median width and/or length of 1 m, the time-of-flight values can be selected from a larger range, e.g., from between 0.001-10 ns. Additionally, the signals reflected from the reference signal 140 sent over the second channel 136B, where the second channel 136B has a different center frequency from the first channel 136A, return decibel magnitude values between 7 and 8 decibels, phases between 191 and 250 degrees, and time-of-flight values between 0.0067 and 0.333 ns. It should be appreciated that these values are exemplary and other values are possible. For example, the magnitude values of the reflected reference signals can be between +/−10 decibels, phase differences can range between 0-359 degrees, and time-of-flight values can range from 0.001-0.5 ns. The collection of these values in aggregate, form a complete representation of a reference signature 144 that can be used as a baseline or point of comparison to later samples taken during operation of the payment device 102. It should be appreciated that the reference signature 144 can be generated before installation of the payment device 102 within an environment E, during the installation of the payment device 102 within an environment E, or periodically after installation of the payment device within environment E. The foregoing characteristic values related to the first channel 136A reflections correspond to an example 10 mm reflections, and the characteristic values related to the second channel 136B reflections correspond to 50 mm reflections; however, it should be appreciated that the reflections can be larger or smaller as appropriate for each channel or for each particular installation of the payment device 102 and/or the specific UWB radio 132 of the payment device 102.

As mentioned above, after installation when payment device 102 is positioned within an environment E such as a retail or dining establishment, payment device 102 is configured to generate at periodic intervals 146 one or more sample signals 148, and receive one or more reflected sample signals 150A-150E (collectively referred to as "reflected sample signals 150") so that it can generate a sample signature 152 to compare to the reference signature 144. In some examples the sample signal 148 is identical to reference signal 140. To that end, the sample signal 148 is a pulse or short burst signal with an outgoing pulse width selected from a range or 1-4 ns, or in some examples 1.5-2.5 ns, or in some examples, 2 ns. Similarly to reference signal 140, the outgoing sample signal 148 can be sent across multiple channels 136 of the UWB radio 132. For example, the UWB radio 132 can send an outgoing sample signal 148 in two or more frequencies ranges or channels 136 with a pulse width of roughly 2 ns. As these channels 136 are selected from the 14 channels set forth in the WiMedia Alliance Specification (discussed above), each of these channels can be assigned a number, e.g., a first channel, i.e., Channel 1 (136A), and a second channel, i.e., Channel 2 (136B). In some examples, the first channel 136A can have a center frequency of approximately 6500 MHz, or in some examples 6489.6 MHz, while second channel 136B can have a center frequency of approximately 8000 MHz, or in some examples, 7987.2 MHz. These center frequencies correspond with channels 5 and 9, respectively of the 14 available UWB channels.

As illustrated in FIG. 4B, the sample signature 148 can include measurements of multiple reflections, i.e., multiple reflected reference signals 150A-150E from structural elements of the payment device 102 and/or from structures in the immediately surrounding environment E of the payment device 102. In other words, once a sample signal 148 is transmitted or broadcast from UWB radio 132 from within housing 104 of payment device 102, that sample signal 148 contacts and reflects off of various structural elements of the payment device 102 or elements surrounding the payment device 102 and return to UWB radio 132 to be received by one or more of the plurality of antennas 134. Various characteristics of the reflected sample signals 150 can be obtained and used to generate a sample signature 152 that can be compared with reference signature 144 to determine whether a tamper condition 156 (discussed below) has occurred. When generating the sample signature 148, the characteristics of the reflected sample signals 150 can be selected from at least one of: a magnitude of the reflected sample signal 150, a phase of the reflected sample signal 150; and a time-of-flight of the reflected sample signal 150.

FIG. 4B illustrates one example of a sample signature 152 shown as a table of reflected sample signal 150 measurements across multiple characteristics. As shown, after sending, transmitting, or otherwise broadcasting sample signal 148 from UWB radio 132, the original sample signal 148 is reflected off of proximate structures within housing 104 and/or from proximate structures outside of, but proximate to, housing 104, generating one or more reflected sample signals 150. One or more antennae of the plurality of antennas 134 are configured to receive the reflected sample signals 150 and determined the characteristics shown, e.g., magnitude of the reflected sample signals 150 in decibels, phase of the reflected sample signals 150 in degrees, and a combined time-of-flight (TOF) of the original sample signal 148 and the reflected sample signal 150 in nanoseconds. As shown, five reflected sample signals 150A-150E are measured. Each of these reflected sample signals 150 represent a reflected representation of original sample signal 148 after reflecting off of one or more surfaces located proximate or within payment device 102. It should be appreciated that more or less reflected sample signals 150 can be used to generate sample signature 152, e.g., 2, 3, 4, 6, 8, 10, 15, or more reflected sample signals 150 can be utilized. As shown, the signals reflected from the sample signal 148 sent over the first channel 136A return decibel magnitude values between 7 and 8 decibels, phases between 59 and 190 degrees, and time-of-flight values between 0.0066 and 0.331 ns. Additionally, the signals reflected from the sample signal 148 sent over the second channel 136B, where the second channel 136B has a different center frequency from the first channel 136A, return decibel magnitude values between 6 and 9 decibels, phases between 190 and 250 degrees, and time-of-flight values between 0.0066 and 0.333 ns. It should be appreciated that these values are exemplary and other values are possible. For example, the magnitude values of the reflected sample signals can be between +/−10 decibels, phase differences can range between 0-359 degrees, and time-of-flight values can range from 0.001-0.5 ns. In some examples where the payment device 102 is larger, e.g., a median width and/or length of 1 m, the time-of-flight values can be selected from a larger range, e.g., from between 0.001-10 ns. The collection of these values in aggregate, form a complete representation of a sample signature 152 that can be compared to the reference signature 144 to determine whether a tamper condition 156 (discussed below) has occurred.

As mentioned above, generation of the sample signatures 152 can occur periodically, i.e., at periodic intervals 146 (shown in FIG. 3). It should be appreciated that the periodic intervals 146 can range from short to long, e.g., immediately after the first sample signature 152 is generated up to and including several days or several weeks from the previous sample signature 152. Additionally, it should be appreciated that the interval in which sample signatures 152 are taken can be selected and varied or adjusted based on the environment E that the payment device 102 is installed within. For example, should payment device 102 be an attended device, i.e., where the device is located where regular supervision of the device is possible, the periodic interval 146 can be longer, e.g., daily or weekly, whereas if the device is installed where regular supervision of the device is not possible, the periodic interval 146 can be shorter, e.g., every 1, 2, 5, 10, 15, 30, or 60 minutes. Additionally, the periodic interval 146 can be dynamic in that it the time between obtaining sample signatures 152 can vary depending on a number of factors. For example, should payment device 102 be located in an area with high foot-traffic where changes in the environment E will happen frequently and/or continuously, the periodic interval 146 and/or the time between obtaining sample signatures 152 can be longer during periods of high traffic and more frequent during periods of low traffic, or vice versa. Furthermore, it should be appreciated that the sample signature 152 can include averaged or normalized values for the reflected sample signals 150 received through the generation of multiple sequential sample signatures 152. In other words, a single sample signature 152 can be generated through averaging multiple sample signatures over a selected time period.

Regardless of the periodic interval 146 selected, and after one or more sample signatures 152 are generated, the one or more sample signatures 152 are compared to the reference signature 144. If the one or more sample signatures 152 deviate from the reference signatures 144 at least a threshold amount or by at least a predetermined value 154, a tamper condition 156 is satisfied indicating that the payment device 102 has potentially been compromised. In some examples, the predetermined value 154 is a percentage deviation between one or more values from within the reference signature 144 and one or more values from within the one or more sample signatures 152. In some examples, the predetermined value 154 is weighted such that a deviation between values related to time-of-flight or phases are weighted more heavily that differences in magnitude of the reflected signals. In some examples, the predetermined value 154 is a percentage deviation between one or more values from within the reference signature 144 compared to one or more values from within the one or more sample signatures 152 that shows greater than or equal to 5% deviation between the two values. For example, a deviation between values of 2% may be an acceptable variance, whereas a deviation between values of 5%, 10%, 15%, 20%, 25%, 30% or more would indicate a tamper condition 156.

FIG. 4B illustrates a satisfied tamper condition 156. As shown, the UWB radio 132 (shown in FIG. 3) is configured to send one or more sample signals 148 from within the payment device 102 and into the environment surrounding the payment device 102. The UWB radio 132 is then configured to received one or more reflected sample signals, e.g., 150A-150E, to form or generate one or more sample signatures 152. Upon comparison of one or more reflected sample signals 150 to one or more characteristic values of the reference signature 144, e.g., the reference signature 144 shown in FIG. 4A, the payment device 102 will determine whether a tamper condition 156 is satisfied. As shown between FIGS. 4A and 4B, some smaller deviations are acceptable without triggering a tamper condition 156. For example, most of the characteristic values corresponding to the first reflection 142A/150A in both reference signal 144 (FIG. 4A) and sample signature 152 (FIG. 4B), are slightly different. As shown the phase of the first channel 136A reflection of the reference signature 144 is 156 degrees while the same channel in the sample signature 152 is 157 degrees. Similarly, between the reference signature 144 and the sample signature 152, the first channel 136A time-of-flight changes from a 0.0067 ns to a 0.0066 ns. Furthermore, the second channel 136B response in the first reflection 150A changes from 191 to 190 degrees and the time-of-flight changes from 0.0067 ns to 0.0066 ns between the reference signature 144 and the sample signature 152. These deviations are relatively small, i.e., a deviation of one degree between 191 to 190 degrees, for example, is a deviation of approximately 0.5%, well below the predetermined value 154 of greater than or equal to 2%. However, as shown in FIG. 4B, there are greater deviations with the second reflection 150B between the reference signature 144 and the sample signature 152. As shown, the characteristic values for the second reflection 150B across the first channel 136A deviate from 156 degrees to 190 degrees for the phase characteristic and from 0.067 ns to 0.081 ns for the time-of-flight characteristic. These deviations, symbolically shown with boxes with cross-hatchings in FIG. 4B, show a deviation between the reference signature 144 and the sample signature 152 above the predetermined value 154, e.g., above a 2% deviation indicating a tamper condition 156 with payment device 102. Similarly, with respect to eh second channel 136B signals, the characteristic values for the second reflection 150B across the deviate from 8 dB to 9 dB for the magnitude characteristic, from 191 degrees to 211 degrees for the phase characteristic, and from 0.067 ns to 0.090 ns for the time-of-flight characteristic. These deviations, symbolically shown with boxes with cross-hatchings in FIG. 4B, show a deviation between the reference signature 144 and the sample signature 152 above the predetermined value 154, e.g., above a 2% deviation indicating a tamper condition 156 with payment device 102.

Predetermined value 154 can also be a fixed value for each characteristic measured. For example, a deviation of more than 0.005 ns between a first channel reflection in the reference signature 144 and a similar a first channel reflection in the sample signature 152 would trigger a tamper condition 156. The fixed value for the time-of-flight characteristic could be selected from a range of values between 0.001-0.1 ns Similarly, a fixed value for a difference in a phase characteristic that would indicate a tamper condition 156 could be selected from a range between 2-180 degrees. Additionally, a fixed value for a difference in a magnitude characteristic that would indicate a tamper condition 156 could be selected from a range of 0.1 dB-10 dB.

If, at any time during operation of payment device 102 a tamper condition 156 is satisfied, payment device 102 can lock down, e.g., a lock down can include preventing the further retrieval and/or storage of sensitive user data, erasing or wiping any stored sensitive data or transaction data that has been stored in memory of the payment device 102, e.g., memory 126, and can include displaying one or more messages on display 114 indicating to the user that the payment device 102 has been locked down and that no further payments will be accepted with that device until it can be reset, e.g., by an authorized technician. The lock down procedures can also include notifying a third party payment authority that the data previously sent to or stored within one or more remote servers can be erased and can trigger a refund procedure for any transactions received within a certain time period of the detection of the tamper condition 156.

Figure 5:
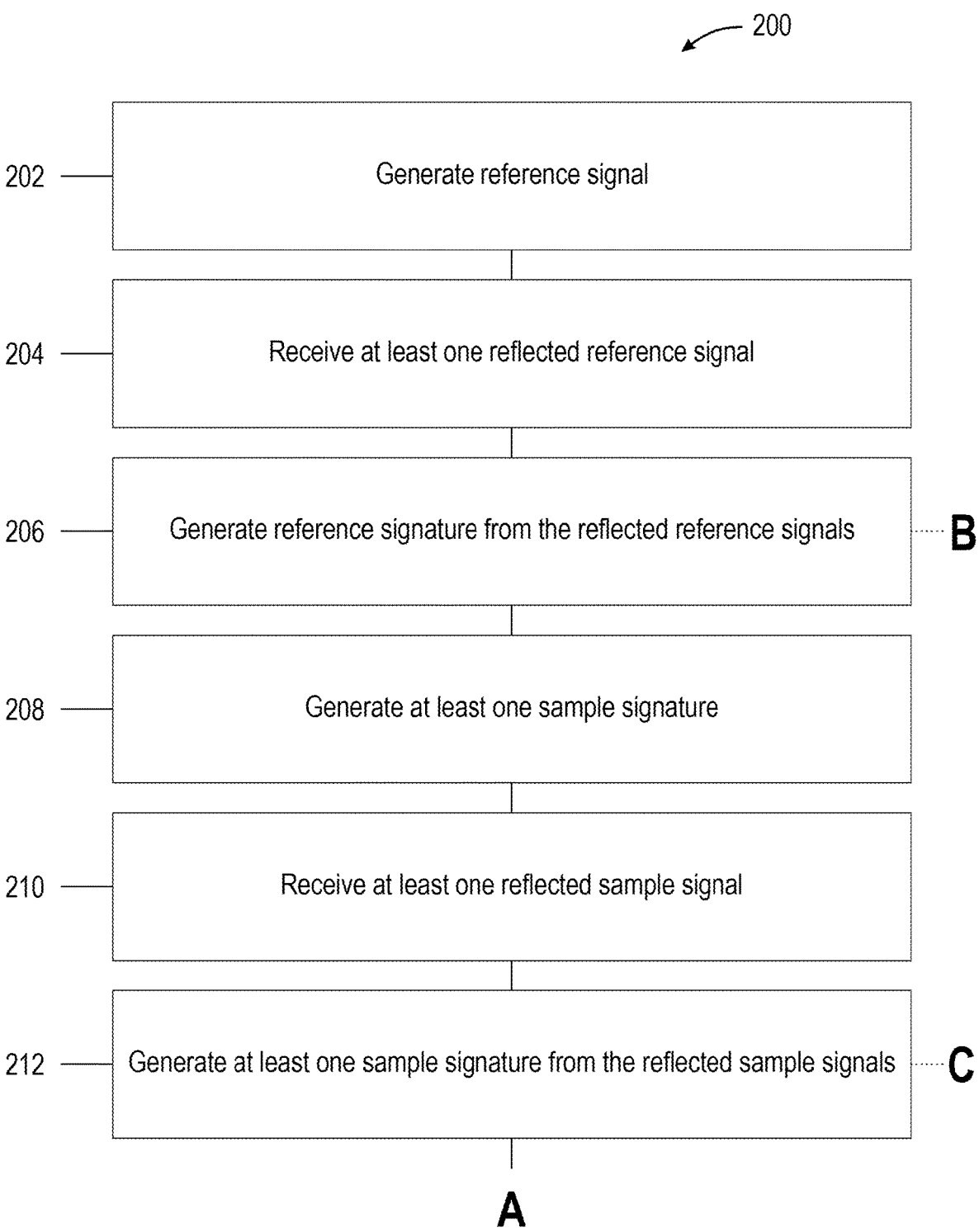
FIG. 5 is a partial flow chart illustrating the steps of a method according to the present disclosure.
Figure 6A:
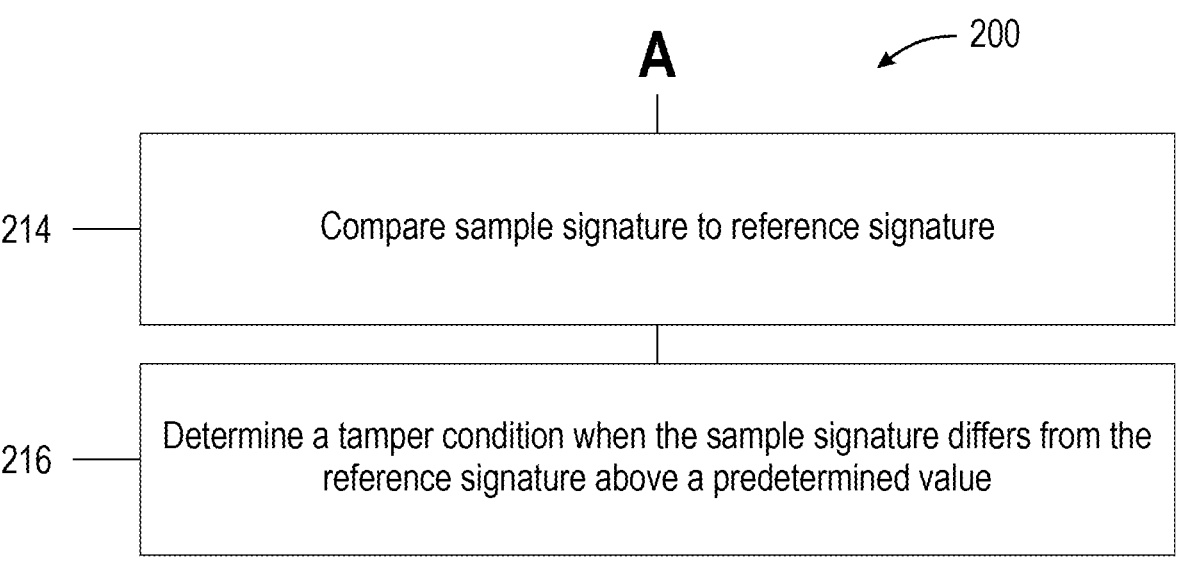
FIG. 6A is a partial flow chart illustrating the steps of a method according to the present disclosure.
Figure 6B:
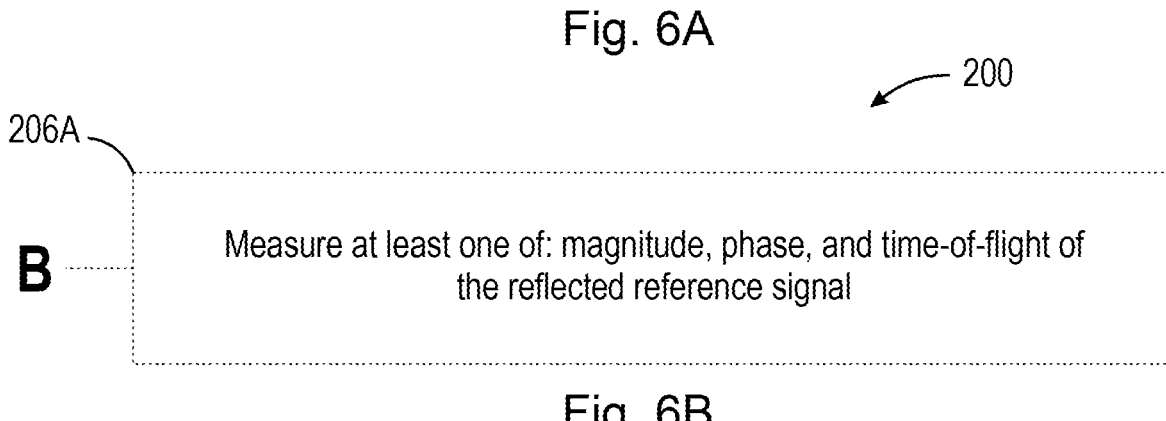
FIG. 6B is a partial flow chart illustrating the steps of a method according to the present disclosure.
Figure 6C:
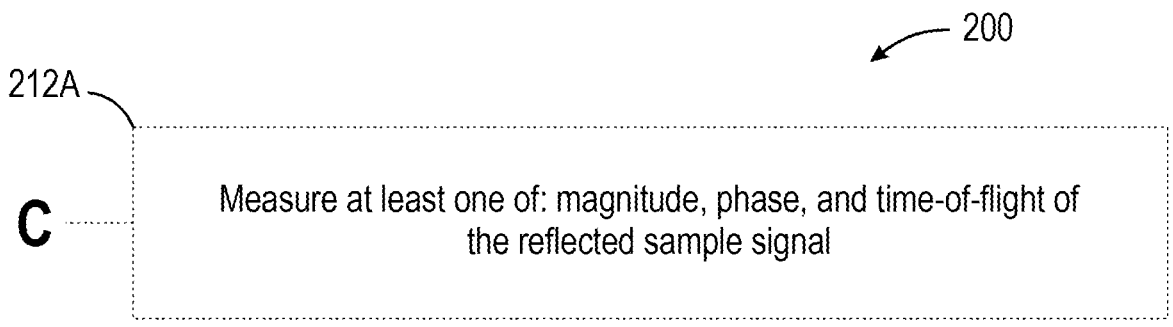
FIG. 6C is a partial flow chart illustrating the steps of a method according to the present disclosure.

FIGS. 5-6C illustrate one example method 200 of detecting a tamper condition 156, the method including, for example: generating, via an ultra-wideband (UWB) radio 132 disposed within a housing 104 of a payment device 102, a reference signal 140 of the payment device 102 within an environment E (step 202); receiving, via the UWB radio 132, at least one reflected reference signal 142 from the housing 104 and/or the environment E (step 204);

generating a reference signature 144 from the at least one reflected reference signal 142 (step 206); generate, via the UWB radio 132, at least one sample signal 148 (step 208); receive, via the UWB radio 132, at least one reflected sample signal 152 (step 210); generate at least one sample signature 152 from the at least one reflected sample signal 150 (step 212); compare the at least one sample signature 152 to the reference signature 144 (step 214); determine a tamper condition 156 when the at least one sample signature 152 differs from the reference signature 144 above a predetermined value 154 (step 216).

Optionally, as shown by connector B in FIGS. 5 and 6B, the step of generating the reference signature 144 from the at least one reflected reference signal 142 comprises measuring at least one of: a magnitude of the at least one reflected reference signal 142, a phase difference between the reference signal 140 and the reflected reference signal 142; and a time-of-flight of the reference signal 140 and/or the reflected reference signal 142 (step 206A). Additionally and optionally, as shown by connector C in FIGS. 5 and 6C, the step of generating the sample signature 152 from the at least one reflected sample signal 150 comprises measuring at least one of: a magnitude of the at least one reflected sample signal 150, a phase difference between the sample signal 148 and the reflected sample signal 150; and a time-of-flight of the sample signal 148 and/or the reflected sample signal 150 (step 212A).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A payment device comprising:

a housing;

at least one ultra-wideband (UWB) radio disposed within the housing;

wherein the UWB radio is configured to transmit at least one reference signal and measure at least one reflected reference signal from an environment outside the housing to generate a reference signature of the environment outside the housing, wherein the UWB radio is configured to transmit at least one sample signal and measure at least one reflected sample signal from the environment outside the housing to generate a sample signature of the environment outside the housing, and wherein a difference between the sample signature and the reference signature above a predetermined value indicates a tamper condition.

2. The payment device of claim 1, wherein the housing includes a printed circuit board (PCB) board and wherein the UWB radio is located on the PCB board.

3. The payment device of claim 2, wherein the PCB board includes or is electrically connected to a card reader assembly.

4. The payment device of claim 1, wherein the at least one UWB radio includes a plurality of antennas.

5. The payment device of claim 1, wherein the housing has a first end and a second end and wherein the UWB radio is positioned closer to the second end of the housing than the first end of the housing.

6. The payment device of claim 1, wherein the reference signature includes a measurement of at least one of: a magnitude of the reflected reference signal, a phase difference between the reference signal and the reflected reference signal; and a time-of-flight of the reference signal and/or the reflected reference signal.

7. The payment device of claim 6, wherein the measurement of the reference signature includes measurements obtained from at least two channels.

8. The payment device of claim 6, wherein the at least one reference signal includes a plurality of reference signals and the reference signature includes measurements across a plurality of reflected reference signals corresponding with the plurality of reference signals.

9. The payment device of claim 1, wherein the sample signature includes a plurality of sample signatures and wherein the plurality of sample signatures are compared to the reference signature to indicate the tamper condition.

10. The payment device of claim 1, wherein the predetermined value is a percentage deviation between one or more values from within the reference signature and one or more values from within the sample signature, and wherein the percentage deviation is greater than 2%.

11. A method of detecting a tamper condition, the method comprising:

generating, via an ultra-wideband (UWB) radio disposed within a housing of a payment device, a reference signal of the payment device within an environment;

receiving, via the UWB radio, at least one reflected reference signal from the environment outside the housing;

generating a reference signature of the environment outside the housing from the at least one reflected reference signal;

generating, via the UWB radio, at least one sample signal;

receiving, via the UWB radio, at least one reflected sample signal;

generating at least one sample signature of the environment outside the housing from the at least one reflected sample signal;

comparing the at least one sample signature to the reference signature; and determining a tamper condition when the at least one sample signature differs from the reference signature above a predetermined value.

12. The method of claim 11, wherein the housing of the payment device includes a printed circuit board (PCB) and wherein the UWB radio is located on the PCB board.

13. The method of claim 12, wherein the PCB board includes or is electrically connected to a card reader assembly.

14. The method of claim 11, wherein the UWB radio includes a plurality of antennas, wherein the plurality of antennas include a first antenna and a second antenna, and wherein the first antenna is a first receiver and a first transmitter and the second antenna is a second receiver.

15. The method of claim 11, wherein the housing has a first end and a second end and wherein the UWB radio is positioned closer to the second end of the housing than the first end of the housing.

16. The method of claim 11, wherein the step of generating the reference signature from the at least one reflected reference signal further comprises:

measuring at least one of: a magnitude of the at least one reflected reference signal, a phase difference between the reference signal and the reflected reference signal; and a time-of flight of the reference signal and/or the reflected reference signal.

17. The method of claim 16, wherein the step of measuring includes taking measurements obtained from at least two channels.

18. The method of claim 16, wherein the at least one reference signal includes a plurality of reference signals and the reference signature includes measurements across a plurality of reflected reference signals corresponding with the plurality of reference signals.

19. The method of claim 11, wherein the at least one sample signature includes a plurality of sample signatures and wherein the plurality of sample signatures are compared to the at least one reference signature to indicate the tamper condition.

20. The method of claim 11, wherein the predetermined value is a percentage deviation between one or more values from within the reference signature and one or more values from within the sample signature, and wherein the percentage deviation is greater than 2%.

\* \* \* \* \*